United States Patent
Hada et al.

(10) Patent No.: US 8,066,574 B2
(45) Date of Patent: Nov. 29, 2011

(54) DAMPER MECHANISM

(75) Inventors: Tomoki Hada, Neyagawa (JP); Hiroshi Uehara, Hirakata (JP)

(73) Assignee: EXEDY Corporation, Osaka (JP)

( * ) Notice: Subject to any disclaimer, the term of this patent is extended or adjusted under 35 U.S.C. 154(b) by 361 days.

(21) Appl. No.: 12/440,377

(22) PCT Filed: Sep. 28, 2007

(86) PCT No.: PCT/JP2007/068991
§ 371 (c)(1),
(2), (4) Date: Mar. 6, 2009

(87) PCT Pub. No.: WO2008/041634
PCT Pub. Date: Apr. 10, 2008

(65) Prior Publication Data
US 2010/0178991 A1    Jul. 15, 2010

(30) Foreign Application Priority Data
Oct. 2, 2006  (JP) .................. 2006-271112

(51) Int. Cl.
*F16F 15/121* (2006.01)
(52) U.S. Cl. ...................... 464/64.1; 464/68.1
(58) Field of Classification Search .................. 464/64.1, 464/68.1, 68.7, 68.8, 68.9; 192/30 V, 55.61, 192/70.17, 204, 213.11, 213.12, 213.21–214.1
See application file for complete search history.

(56) References Cited

U.S. PATENT DOCUMENTS

| | | | |
|---|---|---|---|
| 4,698,045 A | | 10/1987 | Billet et al. |
| 5,161,660 A | * | 11/1992 | Huber ........................ 192/213.1 |
| 5,697,846 A | * | 12/1997 | Uenohara .................... 464/64.1 |
| 5,800,270 A | * | 9/1998 | Uenohara et al. ............ 464/64.1 |
| 5,848,937 A | * | 12/1998 | Mizukami et al. ........... 464/64.1 |
| 6,168,526 B1 | | 1/2001 | Uenohara et al. |
| 6,241,614 B1 | * | 6/2001 | Mizukami et al. ........... 464/64.1 |
| 6,375,575 B2 | * | 4/2002 | Hashimoto .............. 192/213.22 |
| 2003/0226734 A1 | * | 12/2003 | Uehara ...................... 192/70.17 |

FOREIGN PATENT DOCUMENTS

| | | |
|---|---|---|
| EP | 0 784 164 A2 | 7/1997 |
| JP | S61-017722 A | 1/1986 |
| JP | H09-196078 A | 7/1997 |
| JP | H11-241731 A | 9/1999 |
| JP | 2003-184957 A | 7/2003 |

\* cited by examiner

*Primary Examiner* — Gregory Binda
*Assistant Examiner* — Josh Skroupa
(74) *Attorney, Agent, or Firm* — Global IP Counselors, LLP

(57) ABSTRACT

A damper mechanism 4 has a clutch plate 21 and a retaining plate 22 disposed aligned in the axial direction, a hub flange 6 disposed relatively rotatably in the axial direction between the plates 21 and 22, and a second coil spring 8 for elastically linking the plates 21 and 22 to the hub flange 6 in the rotational direction. The plates 21 and 22 have a pair of first main body components 28, and a plurality of linking components 31 that are disposed in the rotational direction between first protrusions 49 and second protrusions 57 and that link the pair of first main body components 28. The plurality of linking components 31 is disposed such that adjacent pitches are different.

9 Claims, 12 Drawing Sheets

DAMPER MECHANISM

CROSS-REFERENCE TO RELATED APPLICATIONS

This U.S. National stage application claims priority under 35 U.S.C. §119(a) to Japanese Patent Application No. JP2006-271112, filed in Japan on Oct. 2, 2006, the entire contents of which are hereby incorporated herein by reference.

TECHNICAL FIELD

The present invention relates to a damper mechanism, and more particularly relates to a damper mechanism for damping torsional vibration in a power transmission system.

BACKGROUND OF THE INVENTION

Damper mechanisms are used to damp torsional vibration in the power transmission systems of vehicles. A clutch device that transmits and shuts off torque to and from an engine will be described here as an example.

A clutch device is made up of a clutch disk assembly that is disposed near a flywheel, and a clutch cover assembly for pressing the clutch disk assembly against the flywheel. The clutch disk assembly functions both as a clutch and as a damper.

The clutch cover assembly has an annular clutch cover that is fixed to the flywheel, a pressure plate provided so as to be capable of moving in the axial direction and rotating integrally with respect to the clutch cover, and a diaphragm spring that biases the pressure plate toward the flywheel.

The clutch disk assembly is made up of a clutch disk that is sandwiched between the pressure plate and the flywheel, a pair of input plates disposed opposite each other and to which the clutch disk is fixed, a hub flange disposed in the axial direction between the pair of input plates, coil springs that elastically link the pair of input plates and the hub flange in the rotational direction, and an output hub that is elastically linked in the rotational direction with respect to the hub flange. The pair of input plates, the hub flange, and the coil springs constitute a damper mechanism.

With a conventional clutch disk assembly, a stop pin is used to restrict relative rotation between the hub flange and the input plates within a specific range of torsional angle. This stop pin links the pair of input plates and passes through a hole formed in the hub flange. A stopper mechanism is realized when the stop pin hits the hole in the rotational direction.

However, the stop pin needs to have a consistent diameter in order to ensure strength, and must be disposed more to the inside in the radial direction than the outer peripheral edges of the pair of input plates. In this case, an adequate relative torsional angle is not obtained even when coil springs with high stiffness are used. Therefore, with a conventional stop pin type of stopper mechanism, the performance of the coil springs cannot be utilized to full advantage.

In view of this, a damper mechanism has been proposed which employs a stopper mechanism in which no stop pin is used (see Japanese Laid-Open Patent Application H9-196078, for example).

SUMMARY OF THE INVENTION

With this damper mechanism, a stopper mechanism is realized by a plurality of linking components that links the pair of input plates. More specifically, the linking components are flat portions formed integrally with one of the input plates. The linking components each have a contact component that extends in the axial direction from the outer peripheral edge of one of the input plates toward the other input plate, and a fixed component that extends inward in the radial direction from the end of the contact component and is fixed to the other input plate. Also, the outer peripheral part of the hub flange is provided with a plurality of protrusions extending outward in the radial direction, and cut-outs formed between the protrusions in the rotational direction. The contact components of the linking components pass through the cut-outs in the axial direction, and come into contact with the protrusions in the rotational direction when the input plates and the hub flange rotate relative to one another. Therefore, with this damper mechanism, no stop pin is used, and a stopper mechanism can be realized by a simple structure.

However, with this damper mechanism, the coil springs are disposed between the linking components in the rotational direction (between the cut-outs of the hub flange in the rotational direction), and the plurality of linking components is disposed at the same pitch (equidistant spacing) in the rotational direction. Accordingly, it is preferable for basically all of the coil spring dimensions to be the same. In other words, with this damper mechanism, even though some of the coil springs can be made smaller, making some of the coil springs larger is extremely difficult in terms of layout. That is, with a conventional damper mechanism, the layout of the coil springs tends to be limited, and the structure does not lend itself to greater variation in torsional characteristics.

Meanwhile, when lower cost is taken into account, there is a need for a damper mechanism with which various torsional characteristics can be obtained while keeping changes to the structure to a minimum.

It is an object of the present invention to afford greater latitude in the design of a damper mechanism while still keeping changes in the structure to a minimum.

A damper mechanism according to a first aspect of the present invention includes a pair of first rotary members disposed aligned in the axial direction, a second rotary member disposed relatively rotatably in the axial direction between the pair of first rotary members, and at least one elastic member for elastically linking the first and second rotary members in the rotational direction. The second rotary member has a second main body component and a plurality of protrusions extending outward in the radial direction from the outer peripheral edge of the second main body component and disposed corresponding to the elastic members. The pair of first rotary members has a pair of first main body components and a plurality of linking components that is disposed in the rotational direction between the plurality of protrusions and that link the pair of first main body components. The plurality of linking components is disposed such that adjacent components have different pitches.

With this damper mechanism, when torque is inputted to the first rotary members, for example, the first rotary members and the second rotary member rotate relative to each other. At this point the torsional vibration inputted to the first rotary members is absorbed and damped by the elastic member. When the first rotary members and the second rotary member rotate relative to each other by a specific torsional angle, the linking components of the first rotary members and the protrusions of the second rotary member come into contact in the rotational direction. As a result, with this damper mechanism, the torque inputted from one rotary member can be transmitted to the other rotary member while torsional vibration can be absorbed and damped during torque input.

In this case, since the plurality of linking components are disposed so that the adjacent pitches are different, the size of the elastic members disposed between the linking components can be varied. For instance, elastic members of large size can be disposed in a region of large pitch. As a result, greater variation in the layout and type of elastic members is possible while changes to the structure can be kept to a minimum, so greater variation in the torsional characteristics of the damper mechanism can be attained. Specifically, with this damper mechanism, greater latitude in the design can be obtained while still keeping changes in the structure to a minimum.

A damper mechanism according to a second aspect of the present invention is the damper mechanism of the first aspect, wherein the linking components have a contact component extending in the axial direction from one of the first main body components, and a fixed component extending inward in the radial direction from the end of the contact component and fixed to the other first main body component. The rotational center of the contact component and the rotational center of the fixed component are at different locations in the rotational direction.

A damper mechanism according to a third aspect of the present invention is the damper mechanism of the second aspect, wherein the rotational centers of the contact components are shifted in the rotational direction away from the rotational centers of the corresponding fixed components, to the side where the adjacent pitch is smaller, using the corresponding linking components as a reference.

A damper mechanism according to a fourth aspect of the present invention is the damper mechanism of any of the first to third aspects, wherein the second rotary member further has a plurality of windows disposed on the inner peripheral side of the protrusions and in which the elastic members are housed. The plurality of protrusions include first protrusions disposed in the region where the adjacent pitch is larger, using the linking components as a reference. The end faces of the first protrusions facing in the rotational direction are disposed on the outside in the rotational direction with respect to the end faces of the corresponding windows facing in the rotational direction.

In this case, windows that are larger than in the past can be formed in the region of the linking components where the adjacent pitches are larger. As a result, elastic members that are larger than those in the past can be disposed, which makes it easier to increase variations in the torsional characteristics.

Here, the phrase "on the outside in the rotational direction" means on the outside in the rotational direction when the rotational center of the first protrusions or the rotational center of the corresponding windows is used as a reference.

A damper mechanism according to a fifth aspect of the present invention is the damper mechanism of the fourth aspect, wherein the plurality of protrusions further include second protrusions disposed in the region where the adjacent pitch is smaller, using the linking components as a reference. The two end faces of the second protrusions in the rotational direction are disposed on the inside in the rotational direction with respect to the two end faces of the corresponding windows in the rotational direction.

In this case, the distance between adjacent protrusions can be increased, and the relative rotational angle between the first rotary members and the second rotary member can also be increased. That is, with this damper mechanism, an operating angle that is the same or larger than that in the past can be ensured.

Here, the phrase "on the inside in the rotational direction" means on the inside in the rotational direction when the rotational center of the second protrusions or the rotational center of the corresponding windows is used as a reference.

DETAILED DESCRIPTION OF THE PREFERRED EMBODIMENTS

An embodiment of the damper mechanism pertaining to the present invention will now be described through reference to the drawings. The example described here is of a clutch disk assembly in which a damper mechanism is installed.

1. Overall Configuration of Clutch Disk Assembly

Figure 1:
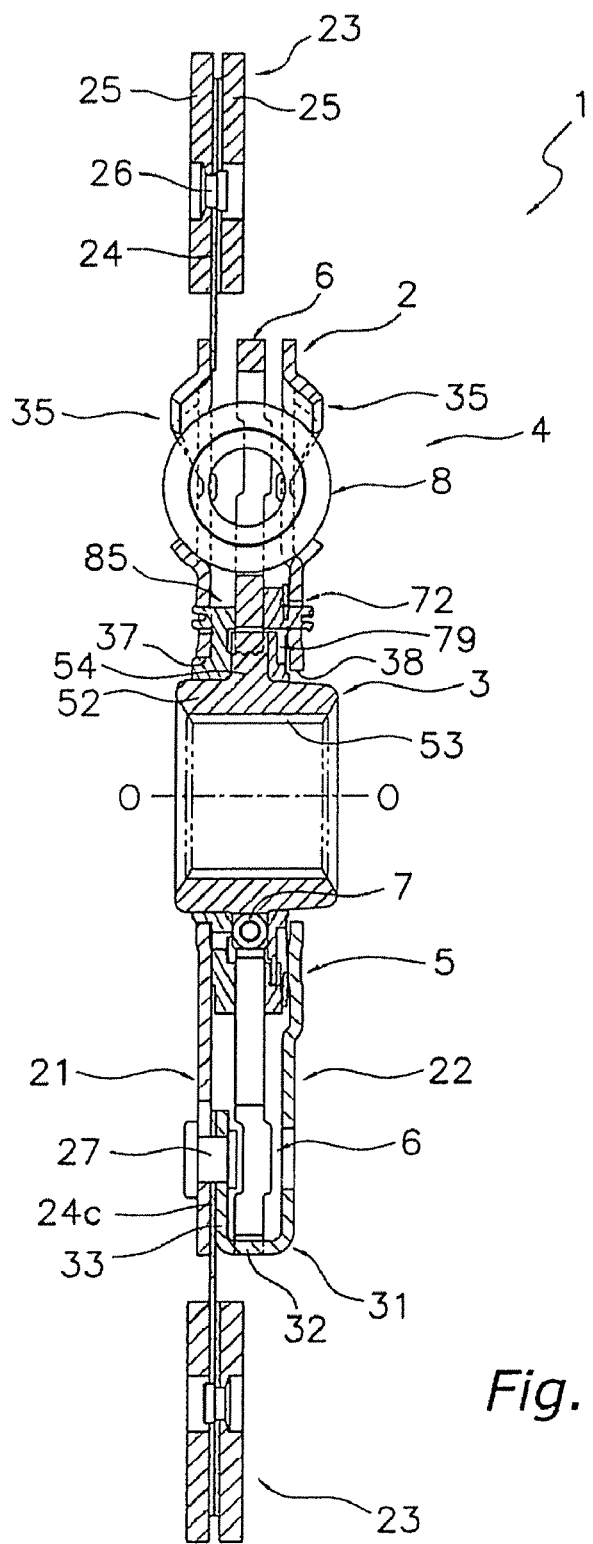
FIG. 1 is a simplified vertical cross section of a clutch disk assembly.
Figure 2:
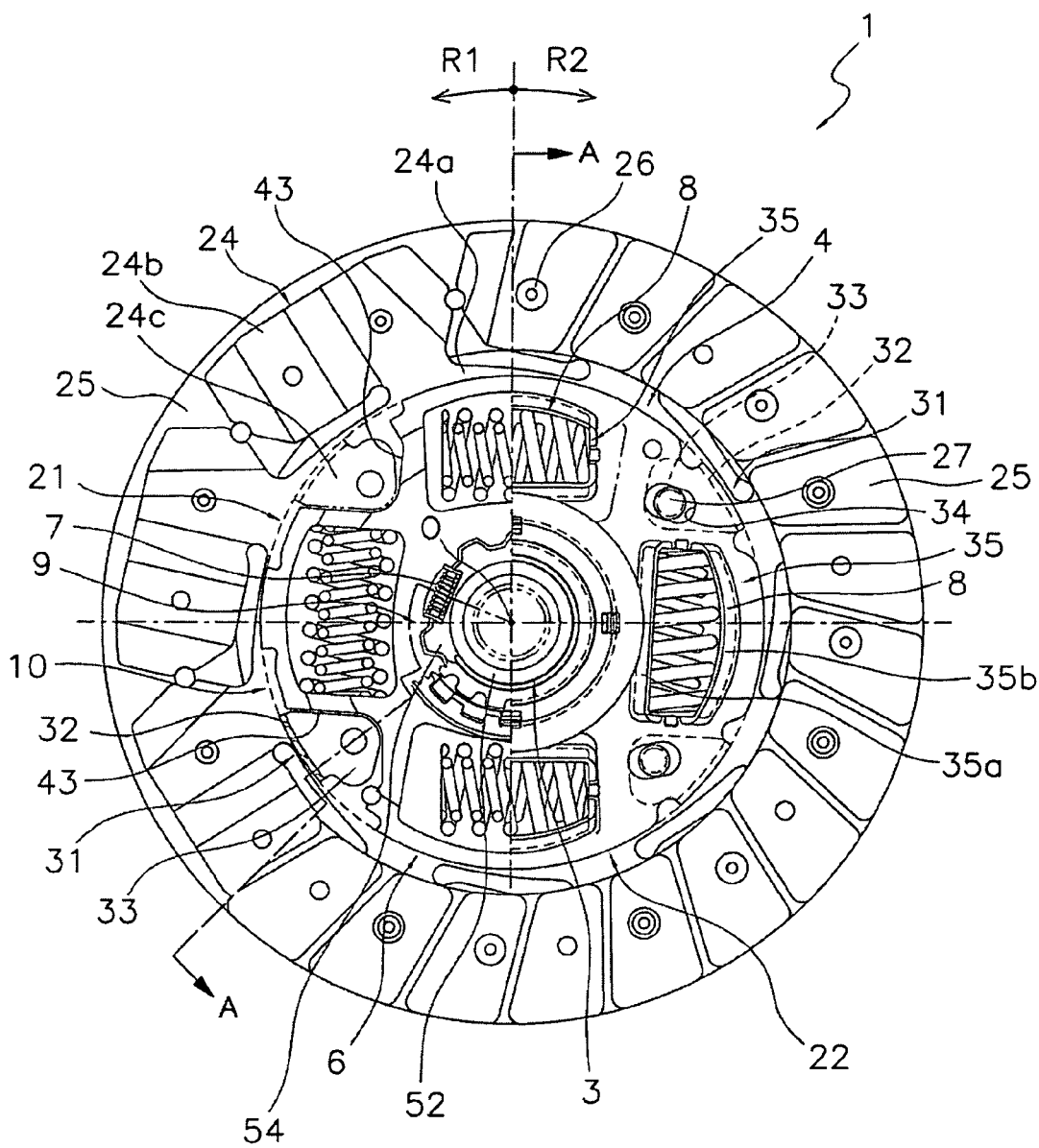
FIG. 2 is a simplified elevational view of a clutch disk assembly.

A clutch disk assembly 1 in which a damper mechanism 4 pertaining to the present invention has been installed will be described through reference to FIG. 1 or 2. FIG. 1 is a simplified vertical cross section of the clutch disk assembly 1, and FIG. 2 is a simplified elevational view of the clutch disk assembly 1. The O-O line in FIG. 1 is the rotational axis of Th clutch disk assembly 1. Also, an engine and a flywheel (not shown) are disposed on the left side in FIG. 1, and a transmission (not shown) is disposed on the right side in FIG. 1. Further, the R1 side in FIG. 2 is the rotational direction drive side (positive side) of the clutch disk assembly 1, while the R2 side is the opposite side (negative side).

The clutch disk assembly 1 is a mechanism used in a clutch device that constitutes part of a power transmission system in a vehicle, and has a clutch mechanism and a damper mechanism. The function of the clutch mechanism is to transmit and to shut off torque by using a pressure plate (not shown) to press the clutch disk assembly 1 against, or release it from, the flywheel (not shown). The function of the damper mechanism is to absorb and to damp torsional vibration inputted from the flywheel side by means of coil springs or the like.

As shown in FIGS. 1 and 2, the clutch disk assembly 1 mainly has a clutch disk 23 to which torque is inputted from the flywheel, and the damper mechanism 4, which absorbs and damps torsional vibration inputted from the clutch disk 23.

The clutch disk 23 is the portion that is pressed against the flywheel (not shown), and mainly has a pair of annular friction facings 25 and a cushioning plate 24 to which the friction facings 25 are fixed. The cushioning plate 24 has an annular component 24a, eight cushioning components 24b provided on the outer peripheral side of the annular component 24a and aligned in the rotational direction, and four fixed components 24c extending inward in the radial direction from the annular component 24a. The friction facings 25 are fixed by rivets 26 to both sides of the cushioning components 24b. The fixed components 24c are fixed to the outer peripheral part of the damper mechanism 4.

2. Configuration of Damper Mechanism

Figure 3:
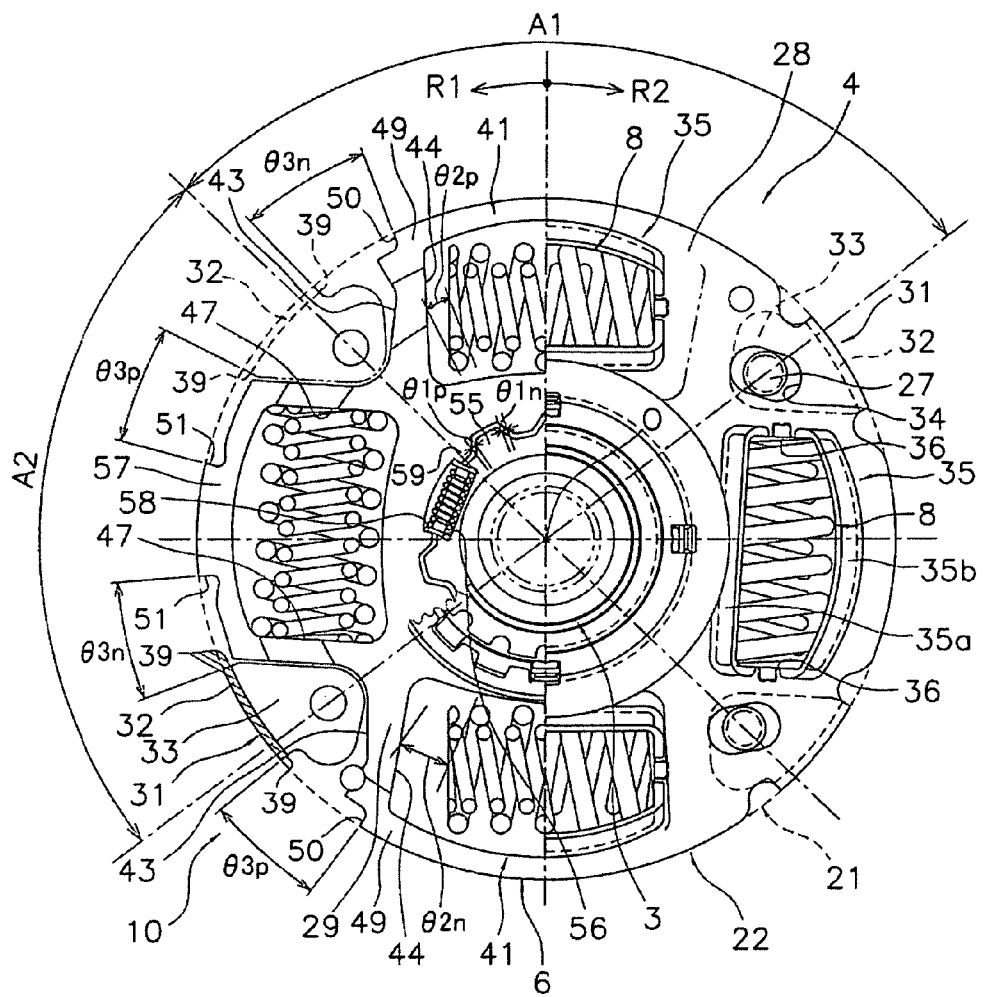
FIG. 3 is a simplified elevational view of a damper mechanism.
Figure 4:
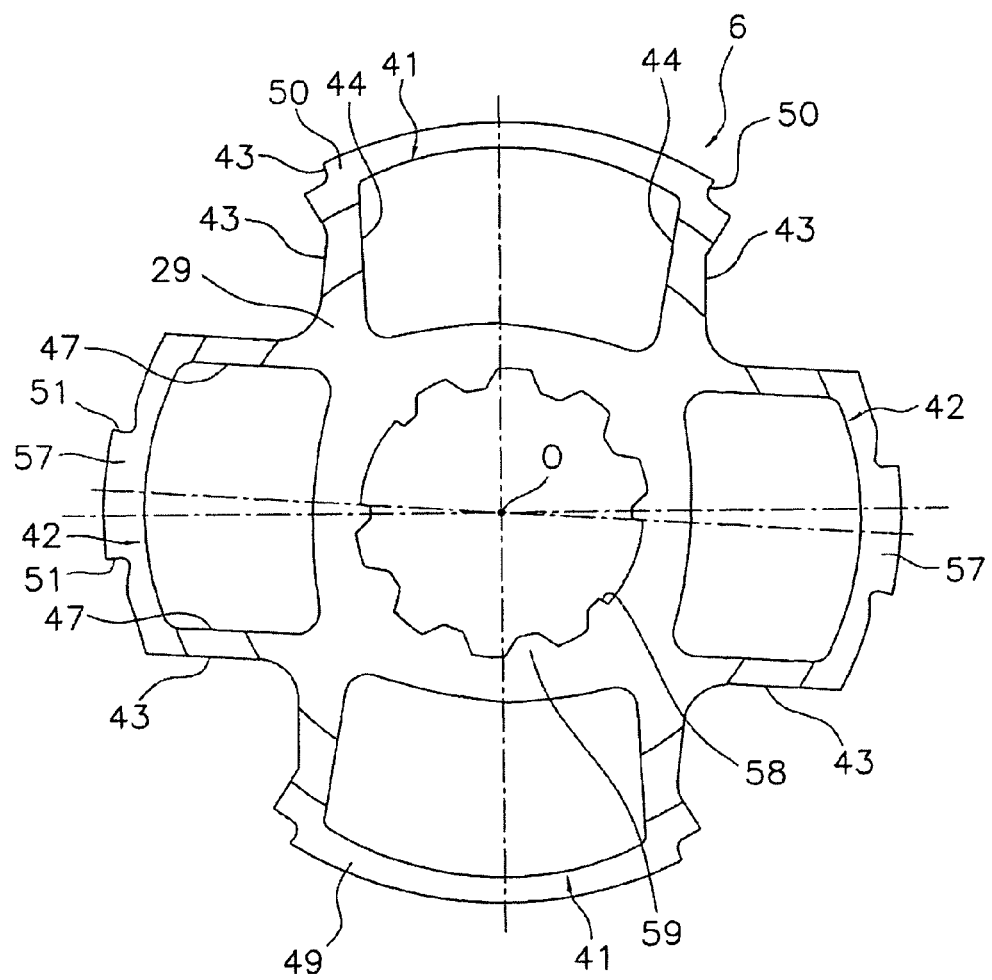
FIG. 4 is an elevational view of a hub flange.
Figure 5:
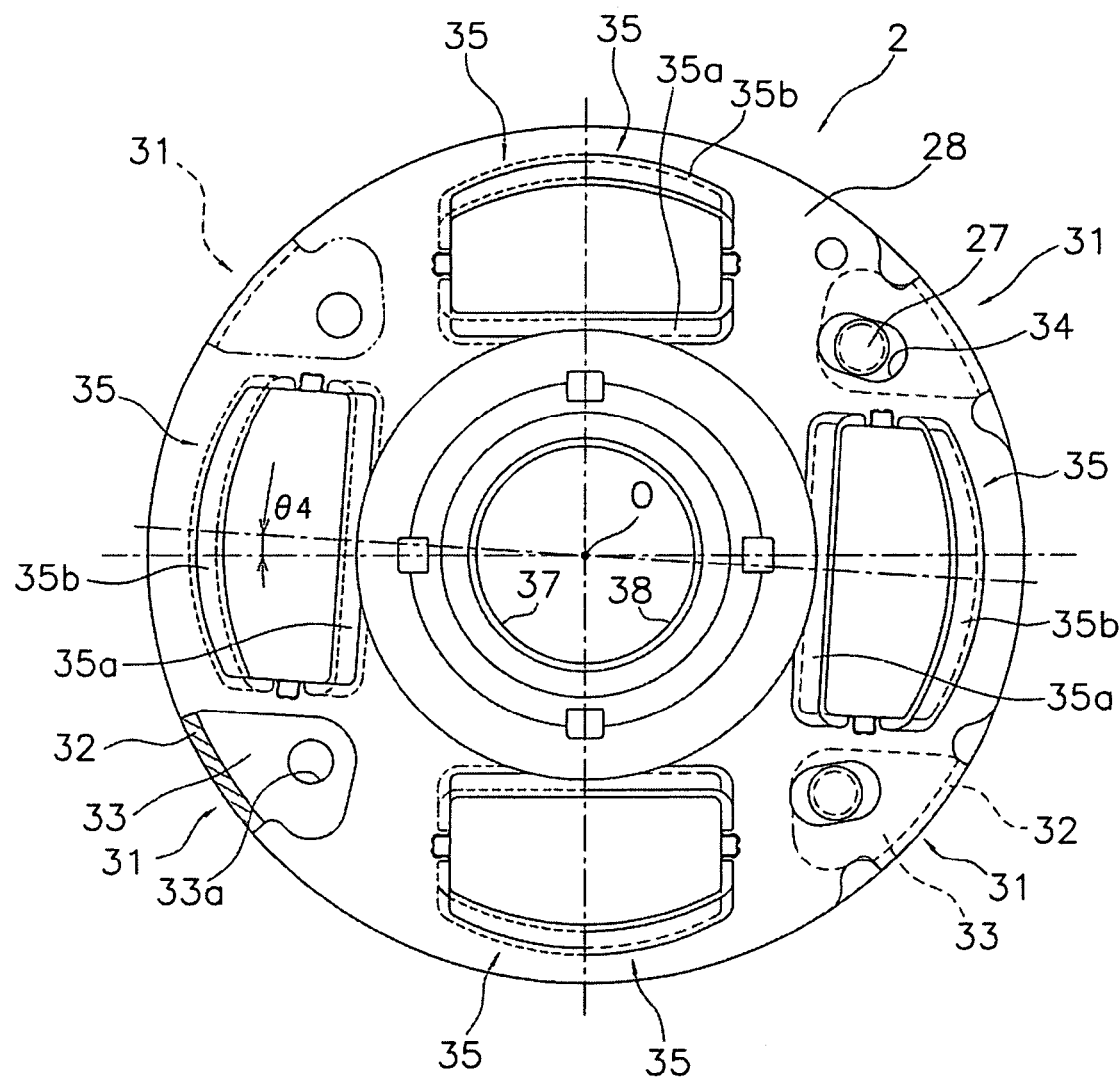
FIG. 5 is an elevational view of an input rotary member.
Figure 6:
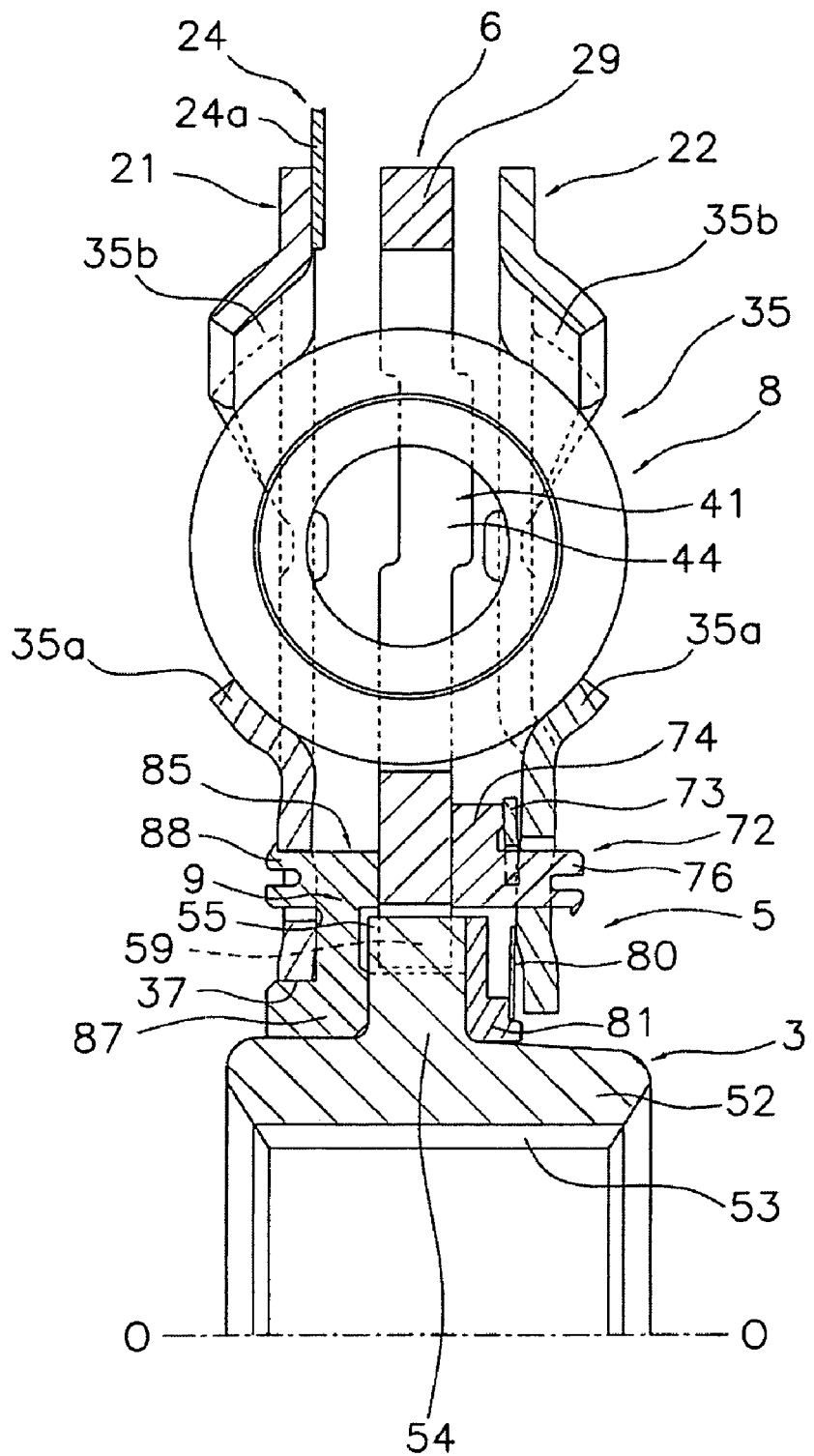
FIG. 6 is a partial cross section of a damper mechanism.
Figure 7:
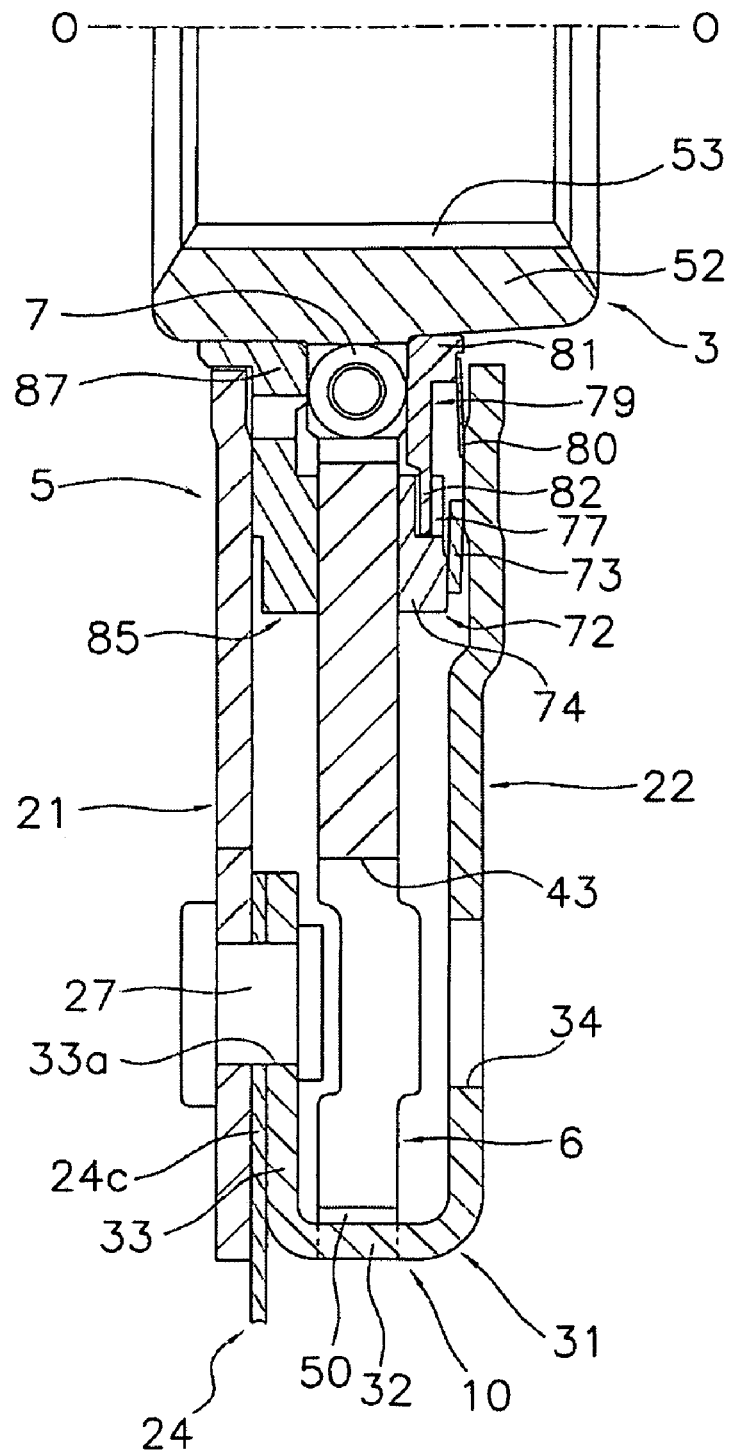
FIG. 7 is a partial cross section of a damper mechanism.

The various members constituting the damper mechanism 4 will now be described in detail with reference to FIGS. 3 to 7. FIG. 3 is a simplified elevational view of the damper mechanism 4, FIG. 4 is an elevational view of a hub flange 6, FIG. 5 is an elevational view of an input rotary member 2, and FIGS. 6 and 7 are partial cross sections of the damper mechanism 4.

The damper mechanism 4 mainly has the input rotary member 2 to which the clutch disk 23 is fixed, the hub flange 6 serving as the second rotary member and disposed rotatably with respect to the input rotary member 2, a spline hub 3 disposed rotatably with respect to the hub flange 6, a first coil spring 7 that elastically links the hub flange 6 and the spline hub 3 in the rotational direction, and a second coil spring 8 that elastically links the input rotary member 2 and the hub flange 6 in the rotational direction. The spline hub 3 is spline-engaged with the end of an input shaft of a transmission (not shown).

The input rotary member 2 has a clutch plate 21 and a retaining plate 22, which serve as the pair of first rotary members. The clutch plate 21 and the retaining plate 22 are disk-shaped or annular members made of sheet metal, and are disposed spaced apart a specific distance in the axial direction. The clutch plate 21 is disposed on the engine side, and the retaining plate 22 is disposed on the transmission side. The clutch plate 21 and the retaining plate 22 are fixed to each other by linking components 31 (discussed below). Therefore, the clutch plate 21 and the retaining plate 22 are able to rotate integrally in a state in which the specific spacing is maintained in the axial direction. Also, the fixed components 24c of the clutch disk 23 are fixed by rivets 27 to the outer peripheral part of the clutch plate 21.

The function of the clutch plate 21 and the retaining plate 22 is to support the second coil spring 8. More specifically, the clutch plate 21 and the retaining plate 22 have a pair of annular first main body components 28, four support components 35 disposed aligned in the rotational direction around the outer peripheral part of the first main body components 28, and four linking components 31 disposed between the support components 35 in the rotational direction.

The support components 35 have flared components 35a and 35b on the inner peripheral side and outer peripheral side. The flared components 35a and 35b restrict movement of the second coil springs 8 in the axial direction and the radial direction. The size of the support components 35 in the rotational direction substantially coincides with the length of the second coils spring 8. Contact faces 36 that come into contact, or nearly come into contact, with the end faces of the second coil springs 8 are formed at the ends of the support components 35 in the circumferential direction. The four support components 35 are disposed so that adjacent pitches are different (see FIG. 5). More specifically, the support components 35 on the left and right in FIG. 5 are shifted in the rotational direction by an angle of θ4 with respect to the top and bottom support components.

The linking components 31 are disposed on the outer peripheral side of the pair of first main body components 28, and link the pair of first main body components 28. More specifically, each linking components 31 has a contact component 32, which extends in the axial direction from the outer peripheral edge of one of the first main body components 28 (in this embodiment, the first main body component 28 of the clutch plate 21) to the other first main body component 28 (in this embodiment, the first main body component 28 of the retaining plate 22), and a fixed component 33 that extends inward in the radial direction from the end of the contact component 32 (see FIG. 7). The fixed components 33 are fixed to the fixed components 24c of the clutch disk 23 and by rivets to the first main body components 28 of the clutch plate 21.

The hub flange 6 is disposed relatively rotatably between the clutch plate 21 and the retaining plate 22, and is elastically linked to the clutch plate 21 and the retaining plate 22 by the second coil springs 8. More specifically, the hub flange 6 has an annular second main body component 29, a pair of first windows 41 and a pair of second windows 42 formed at the outer peripheral part of the second main body component 29, and four cut-outs 43 formed at the outer peripheral part of the second main body component 29. The pair of first windows 41 and the pair of second windows 42 are disposed at locations corresponding to the four support components 35. The first windows 41 are disposed opposite one another in the radial direction, and the second windows 42 are disposed opposite one another in the radial direction.

The second coil springs 8 are housed in the first windows 41 and the second windows 42. The length of the first windows 41 in the rotational direction is set longer than that of the support components 35, and the length of the second windows 42 in the rotational direction is set to substantially the same length as that of the support components 35. First contact faces 44 and second contact faces 47 that come into contact, or nearly come into contact, with the end faces of the second coil springs 8 are formed at both ends of the first windows 41 and the second windows 42 in the circumferential direction.

The spline hub 3 is disposed in the center holes 37 and 38 of the clutch plate 21 and the retaining plate 22. The spline hub 3 has a cylindrical boss 52 extending in the axial direction, and a flange 54 extending outward in the radial direction from the boss 52. A spline hole 53 that engages with the input shaft of the transmission (not shown) is formed in the inner peripheral part of the boss 52.

As shown in FIG. 3, a plurality of outer peripheral teeth 55 formed around the outer peripheral part of the flange 54 mesh with a plurality of inner peripheral teeth 59 formed around the inner peripheral part of the hub flange 6. First cut-outs 56 and second cut-outs 58 in which the first coil springs 7 are housed are formed around the outer peripheral edge of the flange 54 and the inner peripheral edge of the hub flange 6. A pair of spring seats is mounted at the ends of the first coil springs 7. When the first coil springs 7 are not compressed, a gap is formed between the outer peripheral teeth 55 and the inner peripheral teeth 59 in the rotational direction. The torsional angles corresponding to this gap are first gap angles $\theta 1p$ and $\theta 1n$. The gap formed on the R1 side of the outer peripheral teeth 55 corresponds to the gap angle $\theta 1p$, while the gap formed on the R2 side of the outer peripheral teeth 55 corresponds to the gap angle $\theta 1n$.

Also, the second coil springs 8 have a pair of coil springs that is disposed coaxially but have different diameters. The second coil springs 8 are larger in diameter and longer than the first coil springs 7. The spring constant of the second coil springs 8 is set to a larger value than the spring constant of the first coil springs 7. Specifically, the second coil springs 8 are far stiffer than the first coil springs 7. Accordingly, when torque is inputted to the input rotary member 2, the first coil springs 7 begin to be compressed between the hub flange 6 and the spline hub 3, and when the hub flange 6 and the spline hub 3 rotate integrally, the second coil springs 8 begin to be compressed between the input rotary member 2 and the hub flange 6.

As discussed above, the torque inputted to the input rotary member 2 is transmitted via the second coil springs 8 to the hub flange 6, and the hub flange 6 and the spline hub 3 rotate relative to each other. As a result, the first coil springs 7 are compressed between the hub flange 6 and the spline hub 3. Once the relative torsional angle between the hub flange 6 and the spline hub 3 reaches a specific angle, the outer peripheral teeth 55 and the inner peripheral teeth 59 come into contact, causing the members 6 and 3 to rotate integrally, and the input rotary member 2 and the hub flange 6 rotate relative to each other. As a result, the second coil springs 8 are compressed between the input rotary member 2 and the hub flange 6. This causes the torsional vibration inputted from the clutch disk 23 to the input rotary member 2 to be absorbed and damped. The first coil springs 7 act in parallel, and the second coil springs 8 also act in parallel.

2.1: Stopper Mechanism

The damper mechanism 4 is also provided with a first stopper 9 and a second stopper 10 as stopper mechanisms for directly transmitting the torque inputted to the input rotary member 2.

The first stopper 9 is a mechanism for limiting relative movement between the hub flange 6 and the spline hub 3 to a specific range, and has the outer peripheral teeth 55 of the spline hub 3 and the inner peripheral teeth 59 of the hub flange 6. The first stopper 9 permits relative rotation between the hub flange 6 and the spline hub 3 within a range of the gap angles $\theta 1p$ and $\theta 1n$.

The second stopper 10 is a mechanism for limiting relative movement between the hub flange 6 and the spline hub 3 to a specific range, and has the linking components 31 of the input rotary member 2 and the first protrusions 49 and second protrusions 57 of the hub flange 6.

More specifically, a pair of first protrusions 49 and a pair of second protrusions 57 is formed around the outer peripheral edge of the second main body component 29 as protrusions extending outward in the radial direction. The first protrusions 49 and the second protrusions 57 are disposed on the outer peripheral side of the first windows 41 and the second windows 42, and stopper faces 50 and 51 are formed at the ends in the rotational direction. The stopper faces 50 and 51 are able to come into contact with stopper faces 39 of the linking components 31.

In the neutral state shown in FIG. 3, a gap is ensured in the rotational direction between the linking components 31 and the first protrusions 49 and second protrusions 57. The torsional angles corresponding to this gap are the gap angles $\theta 3p$ and $\theta 3n$. The gap formed on the R1 side of the linking components 31 corresponds to the gap angle $\theta 3p$, while the gap formed on the R2 side of the linking components 31 corresponds to the gap angle $\theta 3n$. Consequently, the second stopper 10 permits relative rotation of the input rotary member 2 and the spline hub 3 within the range of the gap angles $\theta 3p$ and $\theta 3n$.

2.2: Friction Generating Mechanism

A friction generating mechanism 5 for utilizing frictional resistance to generate hysteresis torque is provided to the damper mechanism 4 in order to absorb and to damp torsional vibration more effectively. More specifically, the friction generating mechanism 5 has a first friction washer 79, a second friction washer 72, and a third friction washer 85.

The first friction washer 79 is disposed in the axial direction between the flange 54 of the spline hub 3 and the inner peripheral part of the retaining plate 22, and is disposed on the outer peripheral side of the boss 52. The first friction washer 79 is made of plastic. The first friction washer 79 mainly has an annular main body 81 and a plurality of protrusions 82 extending outward in the radial direction from the main body 81.

The main body 81 strikes the face of the flange 54 on the transmission side, and a first cone spring 80 is disposed between the main body 81 and the retaining plate 22. The first cone spring 80 is compressed in the axial direction between the main body 81 and the retaining plate 22. Accordingly, the friction face of the first friction washer 79 is pressed against the flange 54 by the first cone spring 80. Also, the plurality of protrusions 82 are engaged in recesses 77 (discussed below) of the second friction washer 72. Consequently, the first friction washer 79 and the second friction washer 72 are able to rotate integrally.

The second friction washer 72 is disposed between the inner peripheral part of the hub flange 6 and the inner peripheral part of the retaining plate 22, and is disposed on the outer peripheral side of the first friction washer 79. The second friction washer 72 mainly has an annular main body 74, a plurality of engagement components 76 extending from the inner peripheral part of the main body 74 toward the transmission side, and the recesses 77 formed on the transmission side of the inner peripheral part of the main body 74. The second friction washer 72 is made of plastic, for example.

The main body 74 comes into contact with the face of the hub flange 6 on the transmission side, and a second cone spring 73 is disposed between the main body 74 and the retaining plate 22. The second cone spring 73 is compressed between the main body 74 and the retaining plate 22. Consequently, the friction face of the second friction washer 72 is pressed against the hub flange 6 by the second cone spring 73. Also, the engagement components 76 pass through holes in the retaining plate 22. Consequently, the second friction washer 72 and the retaining plate 22 are able to rotate integrally. Further, the protrusions 82 of the first friction washer 79 are engaged in the recesses 77. Accordingly, the first friction washer 79 is able to rotate integrally with the retaining plate 22 via the second friction washer 72.

The biasing force of the first cone spring 80 is designed so be less than the biasing force of the second cone spring 73. Also, the first friction washer 79 has a lower coefficient of friction than the second friction washer 72. Accordingly, the friction (hysteresis torque) generated by the first friction washer 79 is much less than the friction (hysteresis torque) generated by the second friction washer 72.

The third friction washer 85 is disposed between the flange 54 and the inner peripheral part of the clutch plate 21, and is disposed on the outer peripheral side of the boss 52. The third friction washer 85 is made of plastic, for example. The third friction washer 85 mainly has an annular main body 87 and a plurality of engagement components 88 that extend from the main body 87 toward the engine side.

The main body 87 comes into contact with the faces of the flange 54 and the hub flange 6 on the engine side, and conies into contact with the face of the clutch plate 21 on the transmission side. The engagement components 88 pass through holes formed in the clutch plate 21. The third friction washer 85 is able to rotate integrally with the clutch plate 21 by means of the engagement components 88. Also, the main body 87 engages with the center hole 37 of the clutch plate 21 so as to be incapable of relative rotation, and the inner peripheral face thereof comes into slidable contact with the outer peripheral face of the boss 52. Specifically, the clutch plate 21 is positioned in the radial direction by the boss 52 via the third friction washer 85.

As discussed above, a large friction generating mechanism 14 is constituted by the first friction washer 79 and the third friction washer 85, and a small friction generating mechanism 15 is constituted by the second friction washer 72 and the third friction washer 85. When the input rotary member 2, the hub flange 6, and the spline hub 3 rotate relatively, hysteresis torque is generated by the large friction generating mechanism 14 and the small friction generating mechanism 15, and torsional vibration can be effectively damped and absorbed by the damper mechanism 4.

3. Characteristic Configuration of the Present Invention

The characteristic configuration of the damper mechanism 4 pertaining to the present invention will now be described in detail.

The main feature of this damper mechanism 4 is the disposition of the linking components 31. More specifically, as shown in FIG. 3, the four linking components 31 are not disposed at the same pitch, and are instead disposed at different adjacent pitches. In other words, the rotational centers of the fixed components 33 of the linking components 31 are disposed such that the adjacent pitches are different. For example, a first angle A1 formed by the two linking components 31 disposed on both sides of the first protrusions 49 in the rotational direction is greater than a second angle A2 formed by the two linking components 31 disposed on both sides of the second protrusions 57 in the rotational direction. Here, the reference for the first angle A1 and the second angle A2 (pitch reference) is the center in the rotational direction of the rivets 27 that fix the fixed components 33 of the linking components 31 (or the center in the rotational direction of the holes 33a through which the rivets 27 pass). The two linking components 31 disposed on the R1 side of the two first protrusions 49 are disposed at opposing locations, with the rotational axis O in between. Also, the two linking components 31 disposed on the R2 side of the two first protrusions 49 are disposed at opposing locations, with the rotational axis O in between.

With this configuration, the disposition of the cut-outs 43 of the hub flange 6 is different from that in the past. More specifically, as shown in FIG. 3, the shape of the cut-outs 43 is complementary with the shape of the corresponding fixed components 33, and these cut-outs 43 are formed a bit larger than the fixed components 33. This is to allow the fixed components 33 to pass through cut-outs 43 in the axial direction during assembly. Therefore, when the linking components 31 are disposed at different adjacent pitches as mentioned above, the cut-outs 43 are correspondingly disposed so that the adjacent pitches are different. As a result, the first windows 41 disposed in the region formed by the first angle A1, in which the pitch of the linking components 31 is larger, can be larger in the rotational direction than the second windows 42 disposed in the region formed by the second angle A2, in which the pitch of the linking components 31 is smaller.

For example, as shown in FIG. 3, the four second coil springs 8 are all the same size, but the first windows 41 can be larger in the rotational direction than the second windows 42. Accordingly, a gap can be ensured in the rotational direction between the first contact faces 44 of the first windows 41 and the ends of the second coil springs 8. The torsional angle corresponding to this gap is the gap angles $\theta 2p$ and $\theta 2n$. The gap formed on the R1 side of the ends of the second coil springs 8 corresponds to the gap angle $\theta 2p$, while the gap formed on the R2 side of the ends of the second coil springs 8 corresponds to the gap angle $\theta 2n$. The gap angle $\theta 2p$ is set to be smaller than the gap angle $\theta 2n$.

Since a gap is ensured only for the first windows 41 as discussed above, with this damper mechanism 4, the second coil springs 8 can be utilized to achieve two-stage torsional characteristics, as will be discussed below.

Also, as shown in FIG. 3, in addition to the above configuration, the positions in the rotational direction of the rotational center of the contact components 32 are different from those of the rotational center of the fixed components 33. More specifically, the location of the rotational center of the contact components 32 in the rotational direction is shifted with respect to the rotational center of the fixed components 33 corresponding to the contact components 32, toward the adjacent pitch being smaller, using the linking components 31 corresponding to those contact components 32 as a reference. For example, as shown in FIG. 3, if we look at the linking component 31 disposed on the R1 side of the first protrusions 49, we see that the rotational center of the contact component 32 is disposed on the R1 side with respect to the rotational center of the fixed component 33. When this linking component 31 is used as a reference, the rotational center of the contact component 32 is shifted to the region formed by the second angle A2 in which the pitch of the linking components 31 is smaller (to the second angle A2 side). The same applies to the other three linking components 31.

Thus shifting the locations of the contact components 32 with respect to the fixed components 33 in the rotational direction results in the positional relationship of the stopper faces 50 and the first protrusions 49 being different from that in the past. More specifically, with this damper mechanism 4, the two stopper faces 50 formed on the first protrusions 49 are disposed farther to the outside in the rotational direction than the two first contact faces 44 formed in the first windows 41. The stopper face 50 on the R1 side is disposed closer to the R1 side than the first contact face 44 on the R1 side, and the stopper face 50 on the R2 side is disposed closer to the R2 side than the first contact face 44 on the R2 side. Therefore, the length of the first protrusions 49 in the rotational direction is longer than the length of the first windows 41 in the rotational direction. Meanwhile, to ensure the gap angle $\theta 3p$, the two stopper faces 51 formed on the second protrusions 57 are disposed farther to the inside in the rotational direction than the two second contact faces 47 formed in the second windows 42. More specifically, the stopper face 51 on the R1 side is disposed closer to the R2 side than the second contact face 47 on the R1 side, and the stopper face 51 on the R2 side is disposed closer to the R1 side than the second contact face 47 on the R2 side. Therefore, the length of the second protrusions 57 in the rotational direction is shorter than the length of the second windows 42 in the rotational direction.

The above constitution allows the size of the first windows 41 to be increased in the radial direction, and allows the diameter of the second coil springs 8 corresponding to the first windows 41 to be larger.

The phrase "outward in the rotational direction" here means outward in the rotational direction using the rotational center of the first protrusions 49 or the rotational center of the corresponding first windows 41 as a reference. The phrase "inward in the rotational direction" here means inward in the rotational direction using the rotational center of the second protrusions 57 or the rotational center of the corresponding second windows 42 as a reference.

3. Mechanical Circuit Diagram

Figure 8:
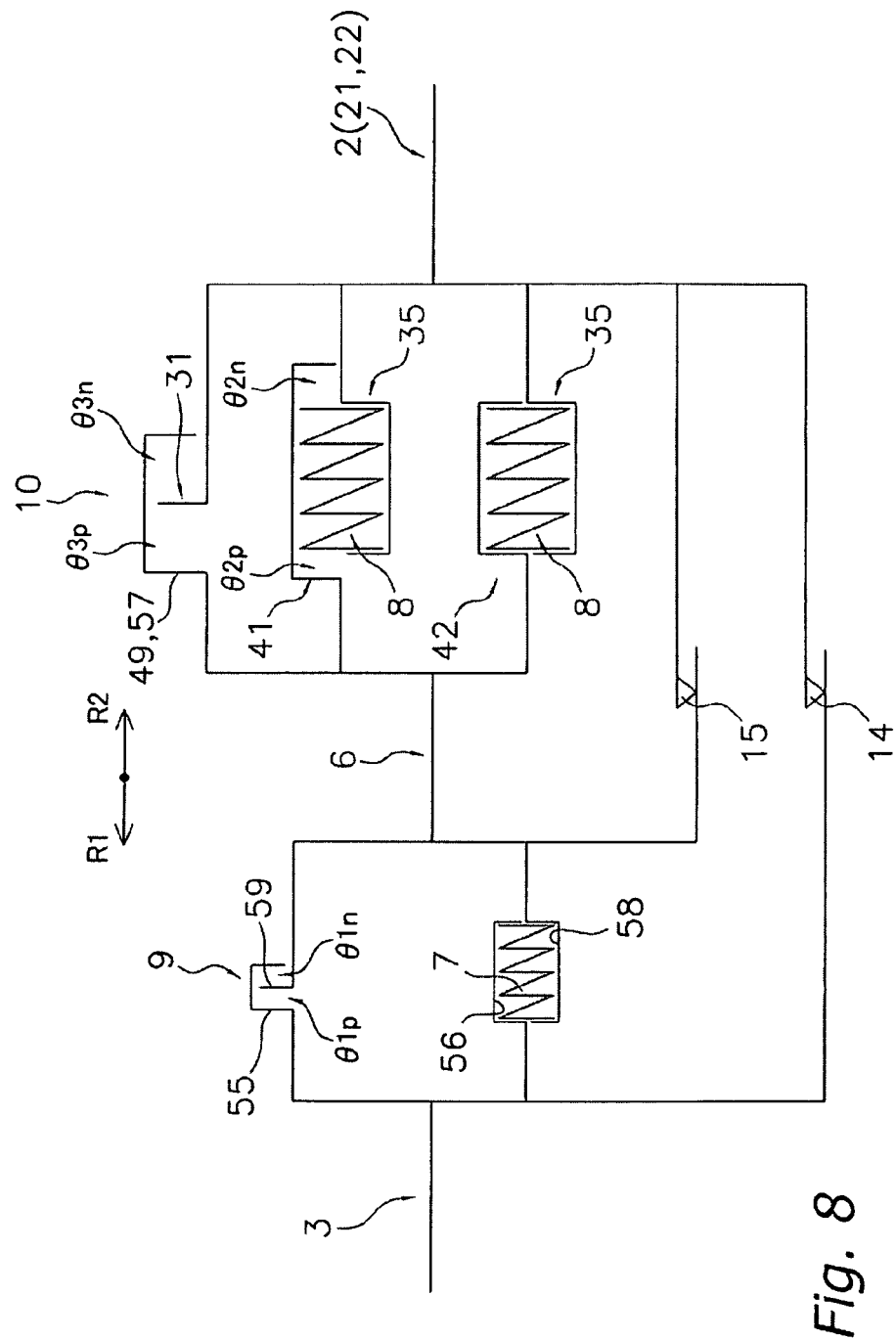
FIG. 8 is a mechanical circuit diagram of a damper mechanism.

FIG. 8 shows the above-mentioned damper mechanism 4 as a mechanical circuit diagram. In this mechanical circuit diagram, the relation of the various members of the damper mechanism in the rotational direction is drawn schematically. Therefore, members that rotate integrally are treated as the same member.

As shown in FIG. 8, the hub flange 6 is disposed between the input rotary member 2 and the spline hub 3 in the rotational direction. The hub flange 6 is elastically linked in the rotational direction to the spline hub 3 via the first coil springs 7. The first stopper 9 is formed between the hub flange 6 and the spline hub 3. The first coil springs 7 can be compressed within a range of first gap angles $\theta 1p$ and $\theta 1n$ in the first stopper 9. The hub flange 6 is elastically linked in the rotational direction to the input rotary member 2 via the second coil springs 8. The second stopper 10 is formed between the hub flange 6 and the input rotary member 2. The second coil springs 8 can be compressed within a range of gap angles $\theta 3p$ and $\theta 3n$ in the second stopper 10. As discussed above, the input rotary member 2 and the spline hub 3 are elastically linked in the rotational direction by the first coil springs 7 and the second coil springs 8, which are disposed in series.

Here, the hub flange 6 functions as an intermediate member disposed between two kinds of coil spring. The structure described above can also be considered to be a structure in which a first damper, composed of the plurality of first coil springs 7 and the first stopper 9 disposed in parallel, and a second damper, composed of the plurality of second coil springs 8 and the second stopper 10 disposed in parallel, are disposed in series. The overall stiffness of the first coil springs 7 is set to be much lower than the overall stiffness of the second coil springs 8. Accordingly, the second coil springs 8 are hardly compressed at all in the rotational direction within a torsional angle range up to the first gap angles $\theta 1p$ and $\theta 1n$.

4. Operation

Figure 9:
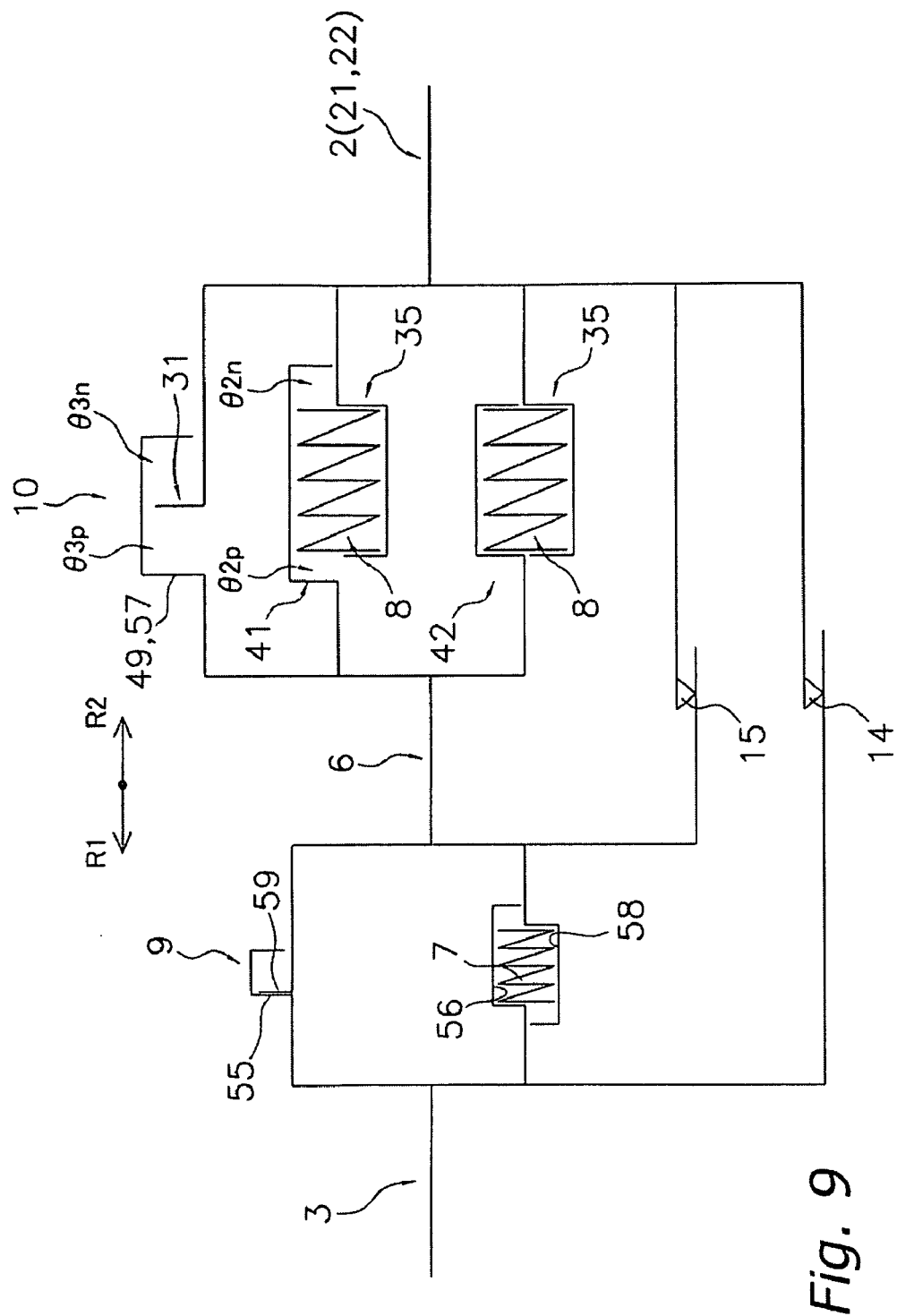
FIG. 9 is a mechanical circuit diagram of a damper mechanism.
Figure 10:
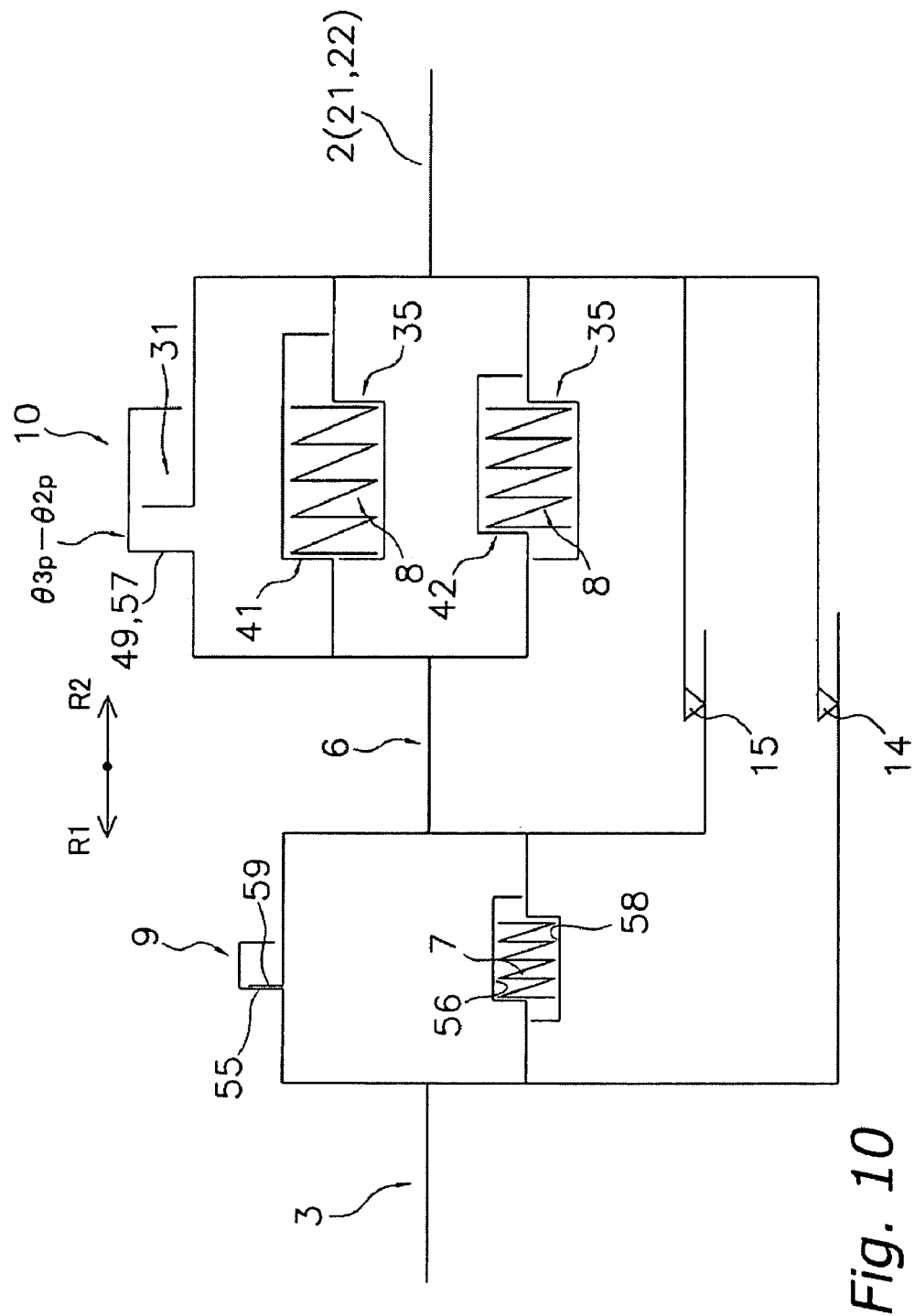
FIG. 10 is a mechanical circuit diagram of a damper mechanism.
Figure 11:
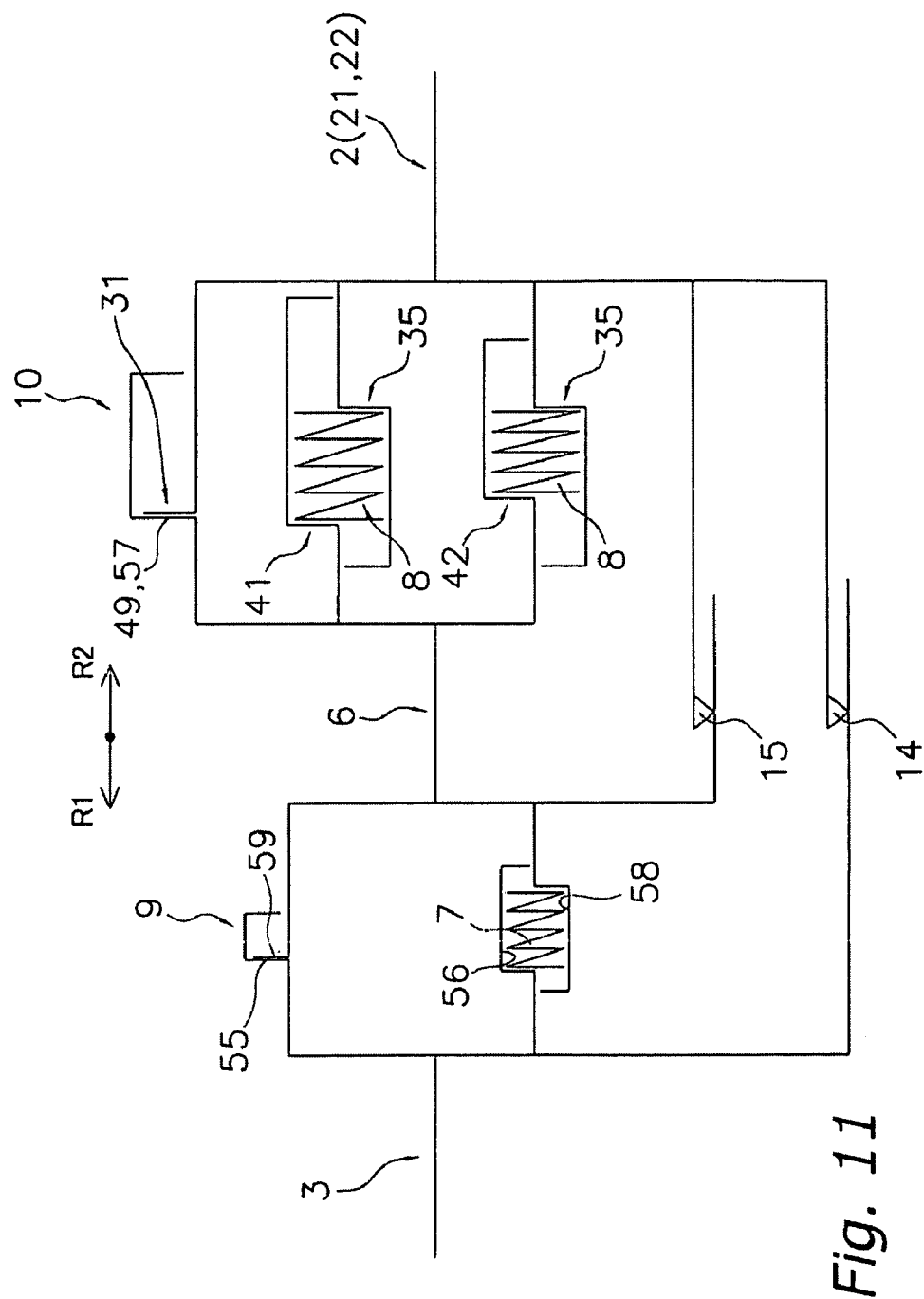
FIG. 11 is a mechanical circuit diagram of a damper mechanism.
Figure 12:
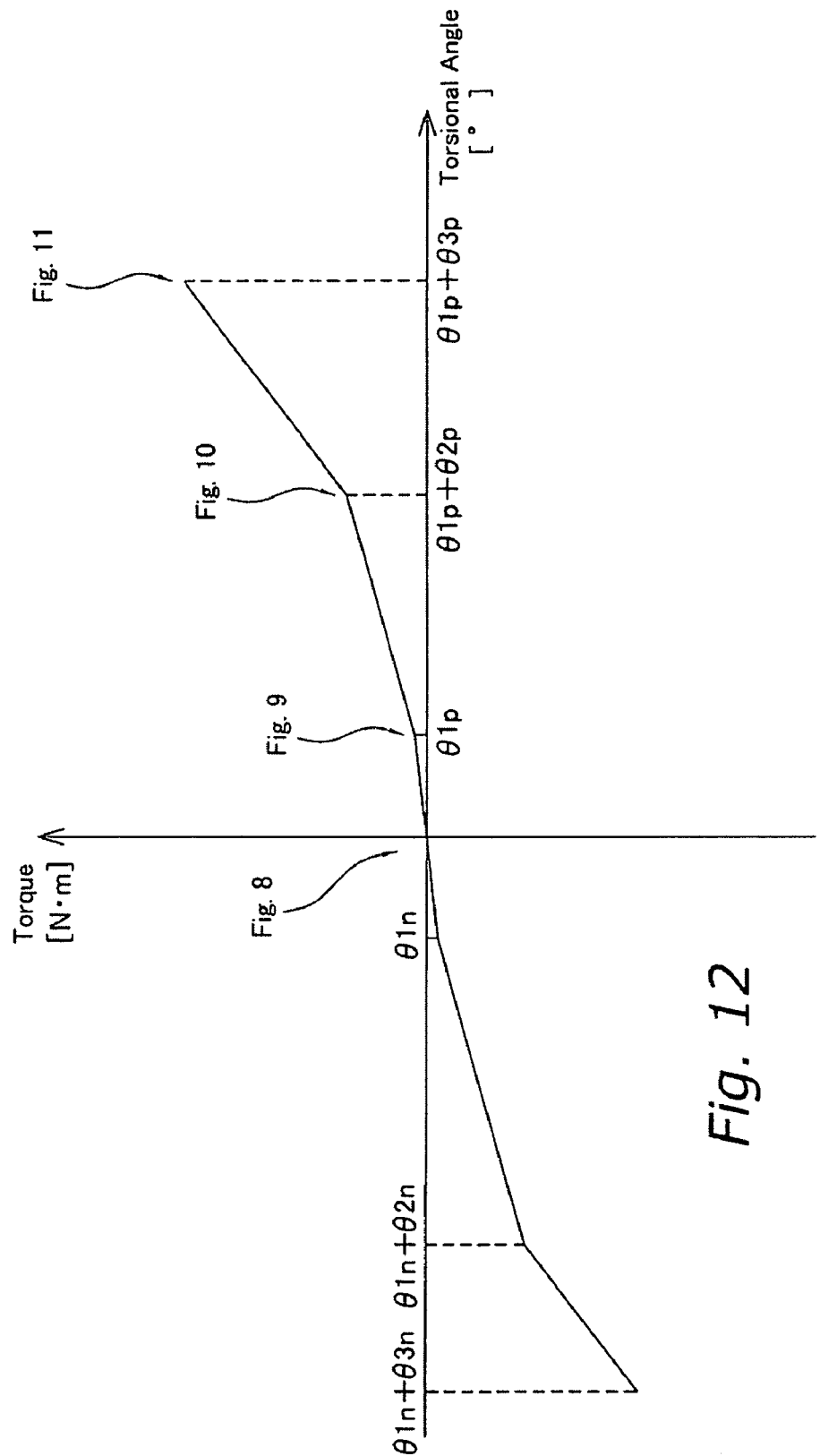
FIG. 12 is a graph of the torsional characteristics of a damper mechanism.

Next, the torsional characteristics and the operation of the damper mechanism of the clutch disk assembly 1 will be described through reference to FIGS. 8 to 12. FIGS. 9 to 11 are mechanical circuit diagrams during operation, while FIG. 12 is a graph of the torsional characteristics. The following description is of the positive torsional characteristics in which the input rotary member 2 is twisted to the R1 side with respect to the spline hub 3 from the neutral state shown in FIG. 8. The same applies to the negative torsional characteristics, so those will not be described here.

The input rotary member 2 is twisted to the R1 side, that is, to the rotational drive side, with respect to the spline hub 3 from the neutral state shown in FIG. 8. Here, since the spring constant of the first coil springs 7 is smaller than the spring constant of the second coil springs 8, the second coil springs 8 are not compressed, but the first coil springs 7 are compressed in the rotational direction between the spline hub 3 and the hub flange 6. The relative rotation between the spline hub 3 and the hub flange 6 causes sliding to occur in the small friction generating mechanism 15. As a result, as shown in FIG. 12, characteristics of low stiffness and low hysteresis torque are obtained within a range from a torsional angle $\theta$ to a torsional angle $\theta 1p$. In the state in FIG. 9, the outer peripheral teeth 55 of the flange 54 and the inner peripheral teeth 59 of the hub flange 6 come into contact in the rotational direction, and the first stopper 9 operates. Accordingly, when the torsional angle of the input rotary member 2 increases from the state in FIG. 9, the spline hub 3 and the hub flange 6 rotate integrally.

When the input rotary member 2 is twisted further to the R1 side from the state in FIG. 9, the second coil springs 8 are compressed in the rotational direction between the hub flange 6 and the input rotary member 2. Here, a gap angle $\theta 2p$ is ensured between the first contact faces 44 of the first windows 41 and the ends of the second coil springs 8. Accordingly, as shown in FIG. 10, within the range from the torsional angle $\theta 1p$ to the torsional angle $\theta 1p+\theta 2p$, only the two second coil springs 8 housed in the second windows 42 are compressed. At this point, frictional resistance is generated in the large friction generating mechanism 14 in addition to the small friction generating mechanism 15.

When the input rotary member 2 is further twisted to the R1 side from the state shown in FIG. 10, the two second coil springs 8 housed in the first windows 41 are compressed in addition to the two second coil springs 8 housed in the second windows 42. Once the torsional angle reaches $\theta 1p+\theta 3p$, the linking components 31 and the first protrusions 49, and the linking components 31 and the second protrusions 57 come into contact in the rotational direction, and the second stopper 10 operates. Specifically, as shown in FIG. 12, within a range from the torsional angle $\theta 1p+\theta 2p$ to the torsional angle $\theta 1p+\theta 3p$, three-stage torsional characteristics are realized with this damper mechanism, and once the torsional angle reaches $\theta 1p+\theta 3p$, the torque inputted to the input rotary member 2 is outputted from the spline hub 3.

As described above, with this clutch disk assembly 1, three-stage torsional characteristics are realized by the first coil springs 7, the second coil springs 8, and the gap angles $\theta 1p$, $\theta 2p$, and $\theta 3p$.

5. Operation and Effect

With this clutch disk assembly 1, since the adjacent linking components 31 have different pitches, the area around the first windows 41 of the hub flange 6 can be larger. As a result, the first windows 41 of the hub flange 6 can be larger, or the second coil springs 8 housed in the second coil springs 8 can be larger.

In this case, for example, as discussed above, the gap angles $\theta 2p$ and $\theta 2n$ can be ensured between the first windows 41 and the second coil springs 8, or the size of the second coil springs 8 can be increased without providing gap angles. Also, just one of the gap angles $\theta 2p$ and $\theta 2n$ can be ensured.

Thus, with this damper mechanism 4, various torsional characteristics can be realized while changes to the structure are kept to a minimum. In other words, design latitude can be markedly expanded.

6. Other Embodiments

The specific constitution of the present invention is not limited to that in the embodiment given above, and various modifications and changes are possible without departing from the scope of the invention.

With the above embodiment, the clutch disk assembly 1 in which the damper mechanism 4 was installed was described as an example, but the present invention is not limited to this. For instance, this damper mechanism can also be applied to a two-mass flywheel, a lock-up device for a fluid torque transmission device, or another such power transmission device.

INDUSTRIAL APPLICABILITY

With the damper mechanism pertaining to the present invention, design latitude can be expanded while keeping changes to the structure to a minimum. Accordingly, the damper mechanism pertaining to the present invention is useful in the field of power transmission devices.

What is claimed is:

1. A damper mechanism, comprising:
   a pair of first rotary members being disposed aligned in the axial direction;
   a second rotary member being disposed relatively rotatably in the axial direction between the pair of first rotary members; and
   at least one elastic member elastically linking the first and second rotary members in the rotational direction,
   the second rotary member having a second main body component and a plurality of protrusions extending outward in the radial direction from the outer peripheral edge of the second main body component and disposed corresponding to the elastic members,
   the pair of first rotary members having a pair of first main body components and a plurality of linking components disposed in the rotational direction between the plurality of protrusions and that link the pair of first main body components, and
   the plurality of linking components being disposed such that adjacent components have different pitches,
   the linking components having a contact component extending in the axial direction from one of the first main body components, and a fixed component extending inward in the radial direction from the end of the contact component and fixed to the other first main body component.

2. The damper mechanism according to claim 1, wherein the rotational center of the contact component and the rotational center of the fixed component are at different locations in the rotational direction.

3. The damper mechanism according to claim 2, wherein the rotational centers of the contact components are shifted in the rotational direction away from the rotational centers of the corresponding fixed components, to the side where the adjacent pitch is smaller, using the corresponding linking components as a reference.

4. The damper mechanism according to claim 3, wherein the second rotary member further has a plurality of windows disposed on the inner peripheral side of the protrusions and in which the elastic members are housed,
   the plurality of protrusions includes first protrusions disposed in the region where the adjacent pitch is larger, using the linking components as a reference, and
   the end faces of the first protrusions facing in the rotational direction are disposed on the outside in the rotational direction with respect to the end faces of the corresponding windows facing in the rotational direction.

5. The damper mechanism according to claim 4, wherein the plurality of protrusions further includes second protrusions disposed in the region where the adjacent pitch is smaller, using the linking components as a reference.

6. The damper mechanism according to claim 2, wherein the second rotary member further has a plurality of windows disposed on the inner peripheral side of the protrusions and in which the elastic members are housed,
   the plurality of protrusions includes first protrusions disposed in the region where the adjacent pitch is larger, using the linking components as a reference, and
   the end faces of the first protrusions facing in the rotational direction are disposed on the outside in the rotational direction with respect to the end faces of the corresponding windows facing in the rotational direction.

7. The damper mechanism according to claim 6, wherein the plurality of protrusions further includes second protrusions disposed in the region where the adjacent pitch is smaller, using the linking components as a reference.

8. The damper mechanism according to claim 1, wherein the second rotary member further has a plurality of windows disposed on the inner peripheral side of the protrusions and in which the elastic members are housed,
   the plurality of protrusions includes first protrusions disposed in the region where the adjacent pitch is larger, using the linking components as a reference, and
   the end faces of the first protrusions facing in the rotational direction are disposed on the outside in the rotational direction with respect to the end faces of the corresponding windows facing in the rotational direction.

9. The damper mechanism according to claim 8, wherein the plurality of protrusions further includes second protrusions disposed in the region where the adjacent pitch is smaller, using the linking components as a reference.

* * * * *